INVENTORS
Raymond L. Ewald
Henry A. Skog
By: Loftus, Moore, Olson & Trexler
attys.

INVENTORS
Raymond L. Ewald
Henry A. Skog
By: Loftus, Moore, Olson & Trexler
attys.

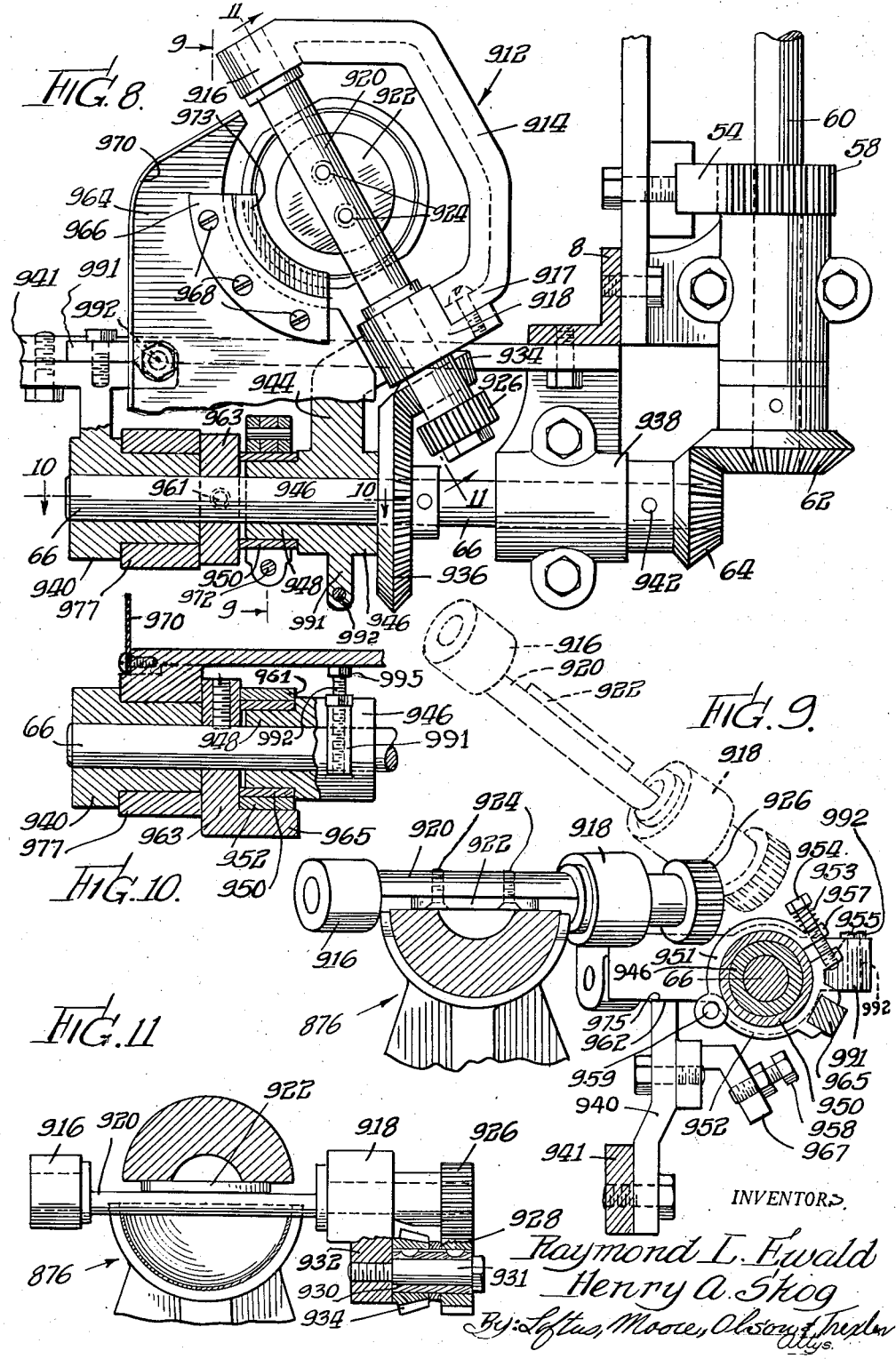

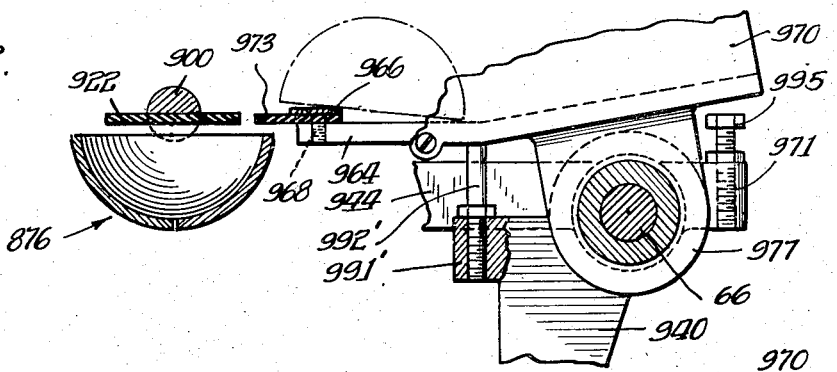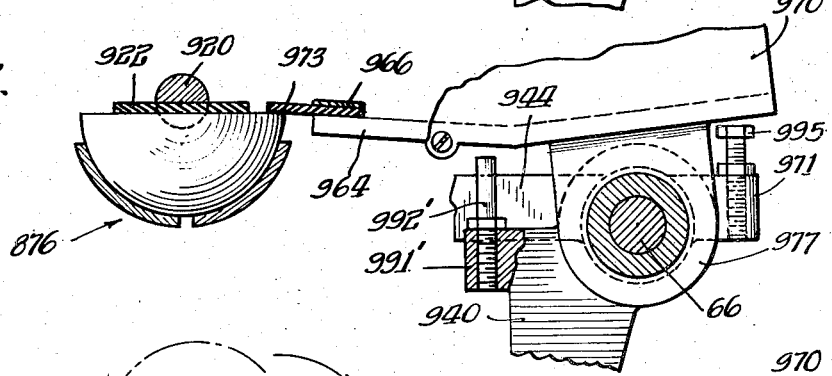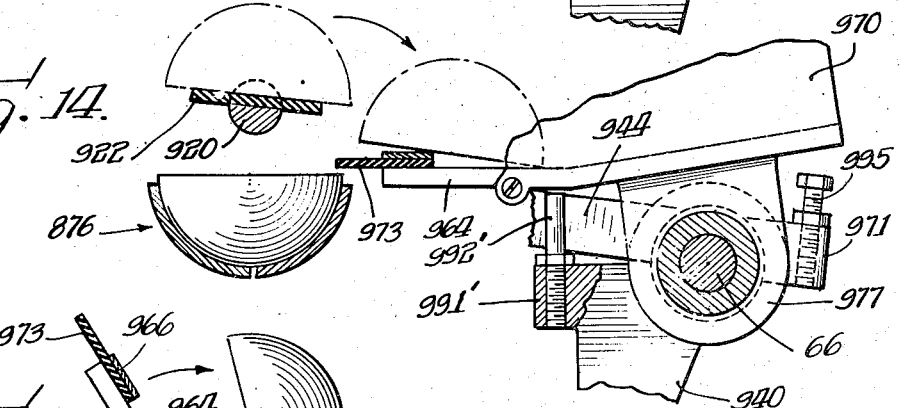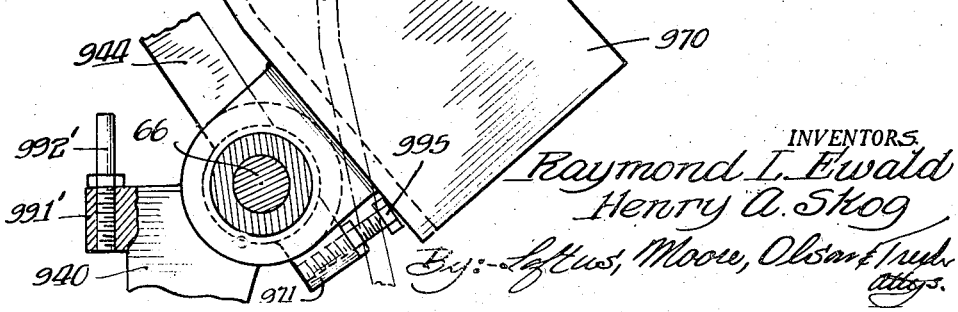

Patented July 19, 1949

2,476,289

UNITED STATES PATENT OFFICE 2,476,289

FRUIT DISCHARGING MEANS

Raymond L. Ewald and Henry A. Skog, Olympia, Wash., assignors to Special Equipment Company, Portland, Oreg., a corporation of Oregon Application August 16, 1944, Serial No. 549,782

22 Claims. (Cl. 146—45)

This invention relates to apparatus for discharging peeled half fruits from fruit holders, and more specifically fruit cups.

In general the invention relates to a type of fruit holder wherein the fruit cup or other holder supports a peeled half fruit, the half fruit resting on the peeling with the peeling underlying the curved surface of the half fruit and severed therefrom but in the normal position that it occupies with relation to the half fruit when unsevered therefrom. Means herein is provided for discharging the peeled half fruit from its peeling while supported in the cup or other fruit holder and without discharging the peeling from the cup.

Among the objects of the present invention are to provide a simplified mechanism which includes a shiftable mechanism for discharging the half fruit from the cup, leaving the peeling in the cup, in combination with a shiftable chute associated with the fruit discharging mechanism and arranged adjacent thereto so that the half fruit when discharged from the cup is projected onto the chute, and the invention includes means for adjustably positioning both the fruit discharging mechanism and the mouth of the chute with respect to the cut face of the half fruit in the cup and likewise with respect to the mouth of the cup, in such a manner as to preclude the edge of the chute, which is provided with means for holding the peeling in the cup during the fruit discharging operation, from being injured during the fruit discharging operation; to provide means for mounting the chute and the fruit discharging mechanism to permit the same to shift out of the plane of the cup to permit the cup to shift to another station and wherein flexible means is provided on the mouth of the chute to engage the cut face of the half fruit in the cup to hold the peel in the cup during the fruit discharging operation therefrom, said means including mechanism for maintaining the flexible means out of contact with the relatively hard rim of the cup while at the same time permitting adjustment of the movement of the flexible means relatively to the rim of the cup, whereby the flexible means will lie on the cut face of either a relatively thick or a relatively thin half fruit when lying in the cup; to provide in combination with a shiftable fruit discharging mechanism for discharging the half fruit from the cup or other fruit holder, a chute freely mounted for pivotal movement during its own fruit receiving and fruit discharging operation, the pivotal movement of each end of the arc of oscillation of the chute being controlled so that in one position peel retaining mechanism carried by the chute is maintained out of contact with the rim of the cup and whereby in the other position of the chute means is provided for preventing an overthrowing of the chute so as to prolong its life, eliminate noise, and speed up the action of the chute; to provide in association with a shiftable fruit discharging mechanism for discharging a half fruit from its fruit receiver or cup, a pivotally mounted chute adapted to receive the discharged half fruit and adapted to oscillate between two positions in one of which adjustable means is provided for limiting the position of one end of the chute with respect to the rim of the cup and additional adjustable means for engaging an opposite end of the chute for preventing overthrow of the chute; to provide a pivotally mounted chute in association with a fruit discharging means for discharging a half fruit from a fruit holding cup onto the chute wherein the chute is freely mounted for oscillation and is actuated in one direction by the first mentioned fruit discharging means to lift the chute to project the fruit away from the fruit discharging means, and wherein means is provided for controlling the position of the chute with respect to the fruit discharging means and the edge of the cup and wherein additional means is provided for adjustably controlling the opposite extreme pivotal movement of the chute to control and determine the extent of discharging movement of the chute; to provide means for controlling the oscillatable movements of a freely pivotal chute adapted to receive a half fruit thereon from a fruit discharging mechanism which discharges a half fruit from a cup or other fruit receptacle wherein means is provided for controlling the oscillatable movement of the chute; to provide means for controlling the terminal movements of a freely oscillatable chute, in combination with a shiftable fruit ejector for ejecting a half fruit from a cup or other receptacle wherein the fruit ejector is adapted to raise the chute to cause the chute discharging movement for the half fruit disposed thereon, and wherein adjustable means is provided for controlling both of the extreme movements of the oscillatable chute in such a manner that neither of the adjustable control movements interferes with the other; to provide an oscillatable chute for a fruit discharging mechanism associated with a receptacle from which a half fruit is adapted to be discharged by the discharging mechanism wherein means is provided for controlling the oscillatory movements of the chute particularly at each end of the oscillation thereof and particularly for adjustably controlling the terminal movements of oscillation of this chute for the purposes hereinafter set forth in this specification; to provide these and other objects of invention as will be apparent from a perusal of the following specification when taken in connection with the accompanying drawings, wherein:

Figure 8 is a section taken on the line 8—8 of Figure 6;

Figure 9 is a section taken on the line 9—9 of Figure 8;

Figure 10 is a sectional view taken on the line 10—10 of Figure 8;

Figure 11 is a sectional view taken on the line 11—11 of Figure 8;

Figures 12 to 15 are rather diagrammatic views of the cup mechanism, paddle mechanism, and the chute mechanism in various positions of the fruit discharging operation.

Figure 1:
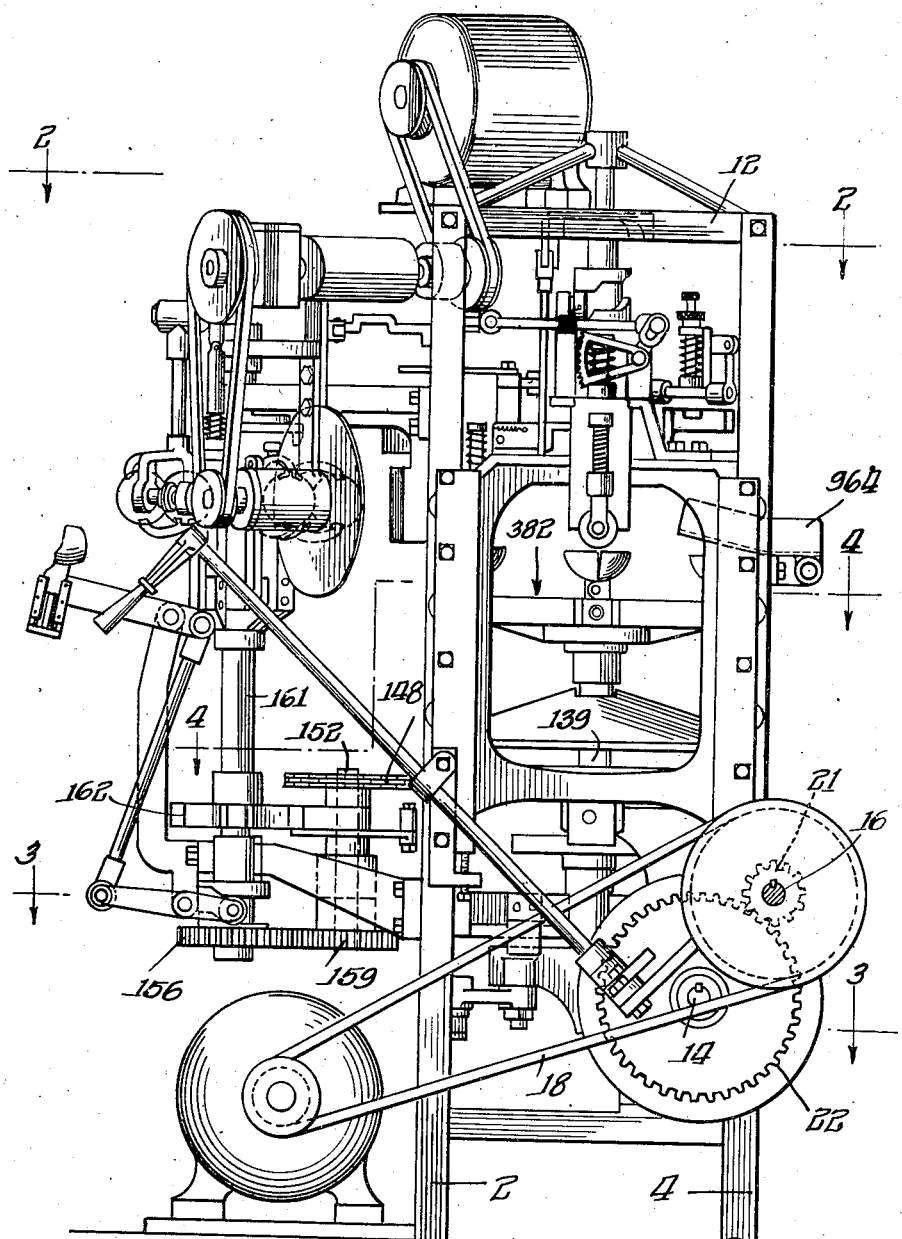
Figure 1 is a side perspective view of one form of organized machine provided with the invention.

The present application is a continuation-in-part of our prior copending, now abandoned application Serial No. 496,885, filed July 31, 1943, which in turn includes subject matter taken from our pending application Serial No. 363,596, filed October 31, 1940 patented April 23, 1946, No. 2,398,780, entitled Fruit treating machine.

The claims of the present application relate to the mechanism for discharging the peeled fruit from the fruit holder, specifically the fruit cup, onto the shiftable chute mechanism and thence from the chute mechanism to a remote point clear of the machine.

Referring to the drawings in detail for a fuller exemplification of the invention, it will be seen that it comprises an automatic machine, power driven, and consisting in general of an upright main frame and an extension frame, the main turret carrying fruit holding means which may be of any desired type, but which herein are shown illustratively and specifically in the form of substantial cup-like members, each adapted to hold a half peach. This main turret, as will be hereinafter set forth, is given an intermittent movement by well known Geneva mechanism, so that the cup-like members are successively brought to a sequence of stations spaced about the main upright frame. These stations comprise, first, a half fruit receiving station, whereby severed sections of peaches, specifically half peaches, are simultaneously deposited in pairs in adjacent cups in the manner hereinafter recited, and thereafter the turret is given a step movement to convey each cup with its contained half peach to a pitting station whereby the pit is severed therefrom. Subsequently said cup with the pitted half peach therein is conveyed to a peeling station wherein the peeling from the peach is severed; next, two adjacent cups with the pitted and peeled half peaches therein are moved to a station, at which the processed half peaches are discharged from the machine, leaving the peelings in these cups.

Inasmuch as the claims of the present invention are concerned with the discharge of the processed half peaches from the machine, only that portion of the automatic machine which refers to the structure of the present claims will be set forth in detail.

The invention of the present construction preferably takes the form of an upright, substantially square main frame comprising four corner posts or angle irons 2, 4, 6, and 8 (see Figures 1, 3 and 4), suitably braced at top and bottom by cross-braces 10 and 12. In addition, other hereinafter described cross bars serve as rigid supports for these upright members. In a general way, extending laterally from this rectangular frame projects a supplementary frame adapted to be bolted or otherwise attached thereto, as shown in Figures 1 to 4, inclusive, which supplementary frame is utilized to support the mechanism which initially receives the frame, the mechanism which severs the peeling at the stem cavity of the fruit, which severs the fruit in halves and which transports the severed halves to the pitting, peeling, fruit-discharging and peel-scavenging mechanism.

The main upright frame hereinbefore described is provided on a relatively low level thereof with horizontally disposed shafts 14 and 16, the latter being power driven through a clutch mechanism 17 (see Figure 3) by means of a belt 18 adapted, in turn, to be driven from any suitable motor 20. The clutch mechanism 17 is of any desirable construction capable of connecting and disconnecting the power source to the main operating shaft of the machine.

Figure 3:
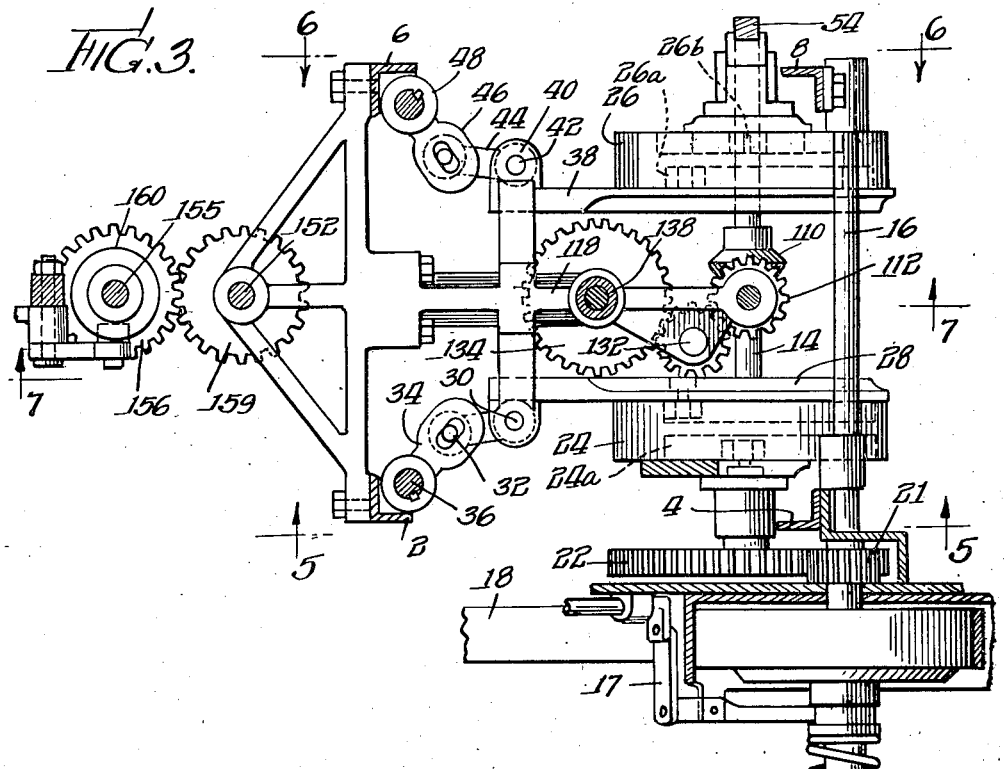
Figure 3 is a section taken on the line 3—3 of Figure 1.
Figure 4:
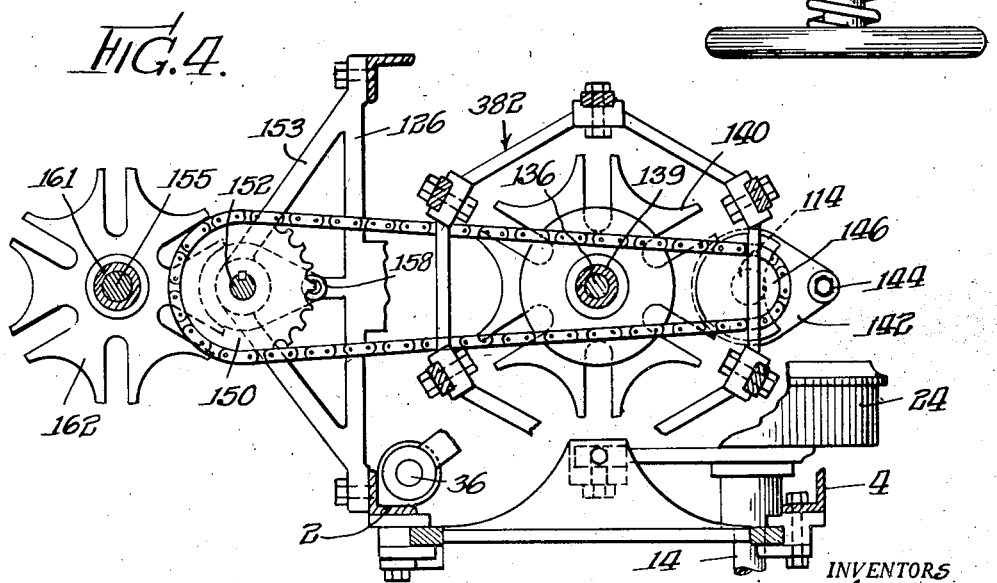
Figure 4 is a section taken on the line 4—4 of Figure 1.
Figure 5:
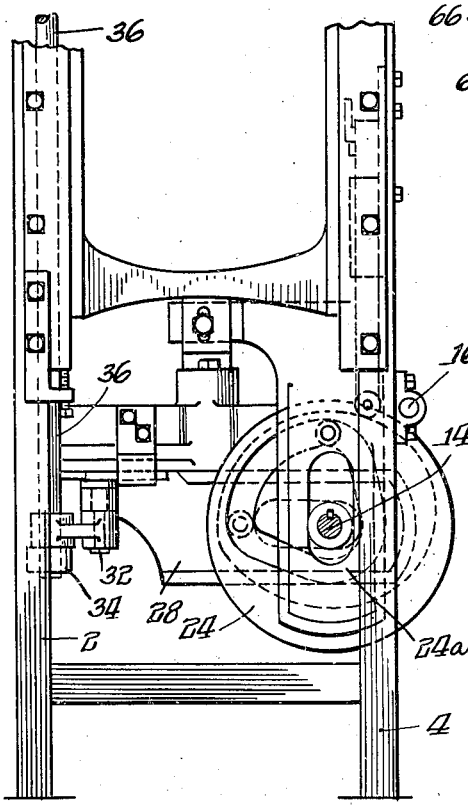
Figure 5 is a section taken on the line 5—5 of Figure 3.

As shown in Figure 3, the shaft 16 carries a gear 21, driving another gear 22 on the horizontal shaft 14. This shaft 14 carries two main cams 24 and 26 fixed on opposite ends thereof. Each of these cams is double-faced so as to provide cam operating means on each side thereof. Cam face 24a comprises a cam track in which operates a hereinafter described roller on a vertically reciprocable slide for raising and lowering the main roll carrying slide hereinafter described. The cam face 24b forms a roller race, in which a roller on a horizontally reciprocable slide 28 shifts in a horizontal motion transversely to the shaft 14. This slide carries on its outer end a bearing pivot 30 linked to a bearing pivot 32 on an arm 34 fixed on a vertical shaft 36. This shaft has fixed bearings in the housing frame 2 of the main upright frame of the machine. Vertical shaft 36 is oscillated by the slide 28 for operating the peeling mechanism hereinafter described.

The cam 26 of the shaft 14 has a cam face 26a forming a cam race, which operates a roller, connected to and operating a horizontally reciprocable slide 38, as shown in Figure 3. This slide 38 is also provided on its outer end with bearing 40 having a vertical pin 42, to the lower end of which is pivoted a link 44. This link 44 carries at its outer end an arm 46, the outer bearing 48 of which is pinned to a vertical oscillatable shaft 50, which is mounted in the corner post 6 of the frame opposite the vertical shaft 36. This shaft 50 has affixed to its upper end an arm hereinafter referred to, which, in turn, pivotally connects at its outer end to a relatively long rod running diagonally across to a universal connection which is, in turn, connected to a mechanism that operates a sector gear reciprocable about a horizontal axis for operating the mechanism which actuates the pitting knives, all as will be hereinafter set forth.

Figure 6:
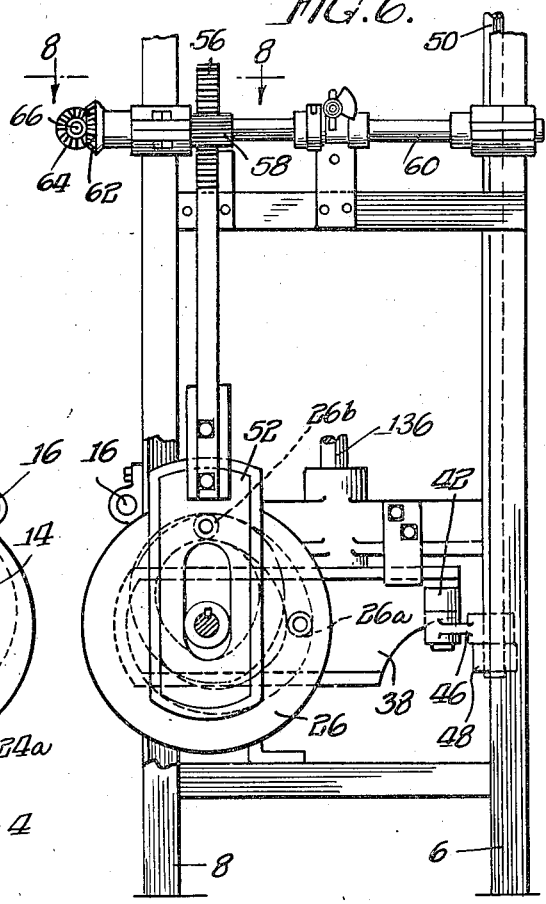
Figure 6 is a section taken on the line 6—6 of Figure 3.

Cam race 26b operates a vertically reciprocable slide 52 (see Figure 6), the upper end of which is provided with a rod 54 having a rack tooth portion 56 operating a pinion 58 on a horizontal shaft 60. This shaft 60 has on one end a bevel gear 62 which, in turn, operates bevel gear 64 on shaft 66 having bearings on the outside of the vertical frame member and on the same level as the main fruit cup turret hereinafter described, which turret is above the lower level of the machine at which the shafts 14 and 16 are located. The shaft 66 operates the mechanism for positioning the auxiliary fruit holding means, specifically the pad over the fruit cup, for holding the half fruit from tilting during peeling and also for oscillating the fruit-discharging means, ejecting the processed half fruit from the machine. These mechanisms will be hereinafter more fully set forth.

A second level of the main rectangular frame of the machine bounded by the uprights 2 to 8, inclusive, provides the location for the Geneva gears for driving the main or half fruit-holding turret, and also the whole fruit turret, including the driving means therebetween, whereby the main or half fruit holder turret is driven at twice the speed as the whole fruit turret. To effect this function, the shaft 14 carries between its ends a bevel gear 110 (see Figure 3) meshing with a bevel gear 112 on a vertical shaft 114 mounted in the bearing 116 carried by a cross frame 118. This cross frame is supported at one end by a suitable vertical brace connected to a cross bar 120 (see Figure 7), in turn carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantial triangularly shaped supplementary frame carrying the whole fruit turret.

Figure 7:
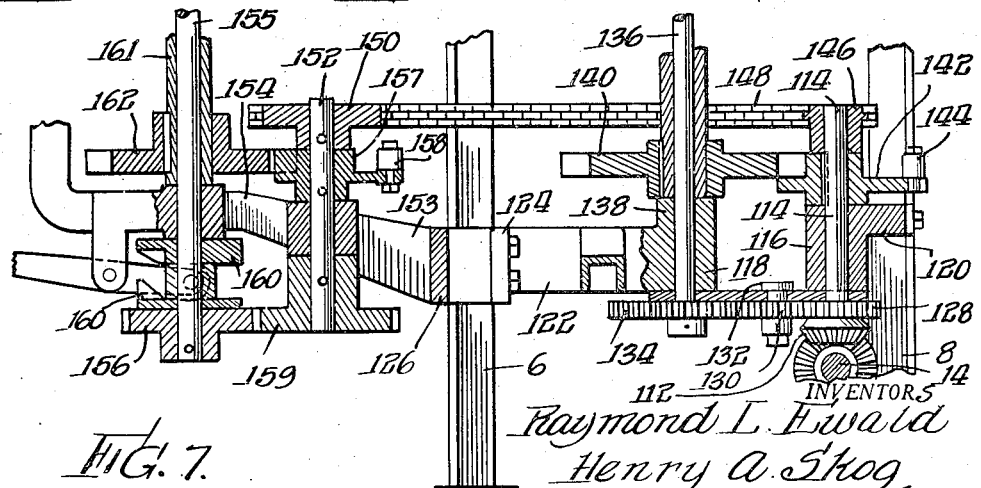
Figure 7 is a vertical sectional view taken on the line 7—7 of Figure 3.

As shown in Figure 7, shaft 114 carries a bevel gear 112 and also carries above it a gear 128, which latter meshes with a second gear 130 on a bearing 132 on the cross frame 118. Gear 130 meshes with a larger gear 134 horizontally fixed on vertical shaft 136 having a bearing in cross frame 118. Turret shaft 136 is surrounded by a bearing 138, above which is a long sleeve 139, along which is fixed a Geneva gear 140 having slots cooperating with a Geneva member 142 on shaft 114. This latter Geneva member 142 has a circular periphery on which is mounted roller 144 for cooperation with the radial slots of gear 140 aforesaid for intermittently rotating sleeve 139 and for holding it stationary between partial turns. The upright shaft 114 above the Geneva member carries a sprocket gear 146 (see Figure 7) driving a chain 148 running horizontally across the frame of the machine to a larger sprocket 150 fixed to shaft 152. This shaft is mounted upon a substantially triangular frame 153 carried by and integral with the cross bar 126. The frame 153 carries a bearing for the shaft 152, and also has a heavy extension bearing 154 for the whole fruit turret shaft 155. Both of these shafts are vertical and parallel to each other. The whole fruit turret shaft 155 extends vertically upward toward the top of the frame. The shaft 152 has pinned thereto just above the bearing 153 a part 157 of the Geneva, this part carrying the roller 158.

In addition, the shaft 152 has pinned below the support 154 a gear wheel 159 which meshes with another gear 156, which is pinned to the bottom of the shaft 155. Just above the gear 156, cam 160 is pinned to shaft 155, and above bearing 154 the shaft 155 carries a relatively long sleeve 161 to which is keyed the cooperative part 162 of the Geneva, whereby, through the intermediary of the Geneva 162, the sleeve 161 is intermittently rotated. Sleeve 161 carries the whole fruit feed turret.

The present invention, as an automatic machine, provides means for feeding a series of whole peaches into the machine in such a manner that they are sawed or split or cut into halves and are deposited into individual cups with the cut face of the half fruit uppermost. These cups are mounted on the main turret which carries them intermittently to a pitting station where the half pit from each half fruit is removed. From thence the cups containing the pitted half fruits are intermittently carried to a peeling station, or the peeling operation may precede the pitting operation. At the pitting station an arcuate knife passes through the flesh of the half fruit just beneath the skin, to peel the same, leaving the peeled half fruit lying directly on its severed peel, the peel occupying its normal position in the cup and contacting the inner walls of the cup. Next the peeled half fruit in this condition passes to a fruit discharge station, at which the mechanism forming the subject matter of the present invention is located. The other mechanisms shown and/or described in the drawings form the subject matter of separate divisional applications.

The half fruit receiving cups are constructed in the manner set forth in the prior application of Raymond L. Ewald and Henry A. Skog, Serial No. 185,332, now issued as Patent No. 2,280,813, of April 28, 1942. However, the means for moving the enlarged half section into eccentric relation to the stationary half fruit station has been slightly altered since, and forms no part of the present invention and will not be further described.

Wherever the phrase "fruit cup" is used in the claims it is to be understood to include any desired type of fruit holder for receiving and holding a half fruit therein and cooperable with the fruit discharging mechanism hereinafter described, and in a manner substantially as described.

*Processed fruit discharging station*

Figure 2:
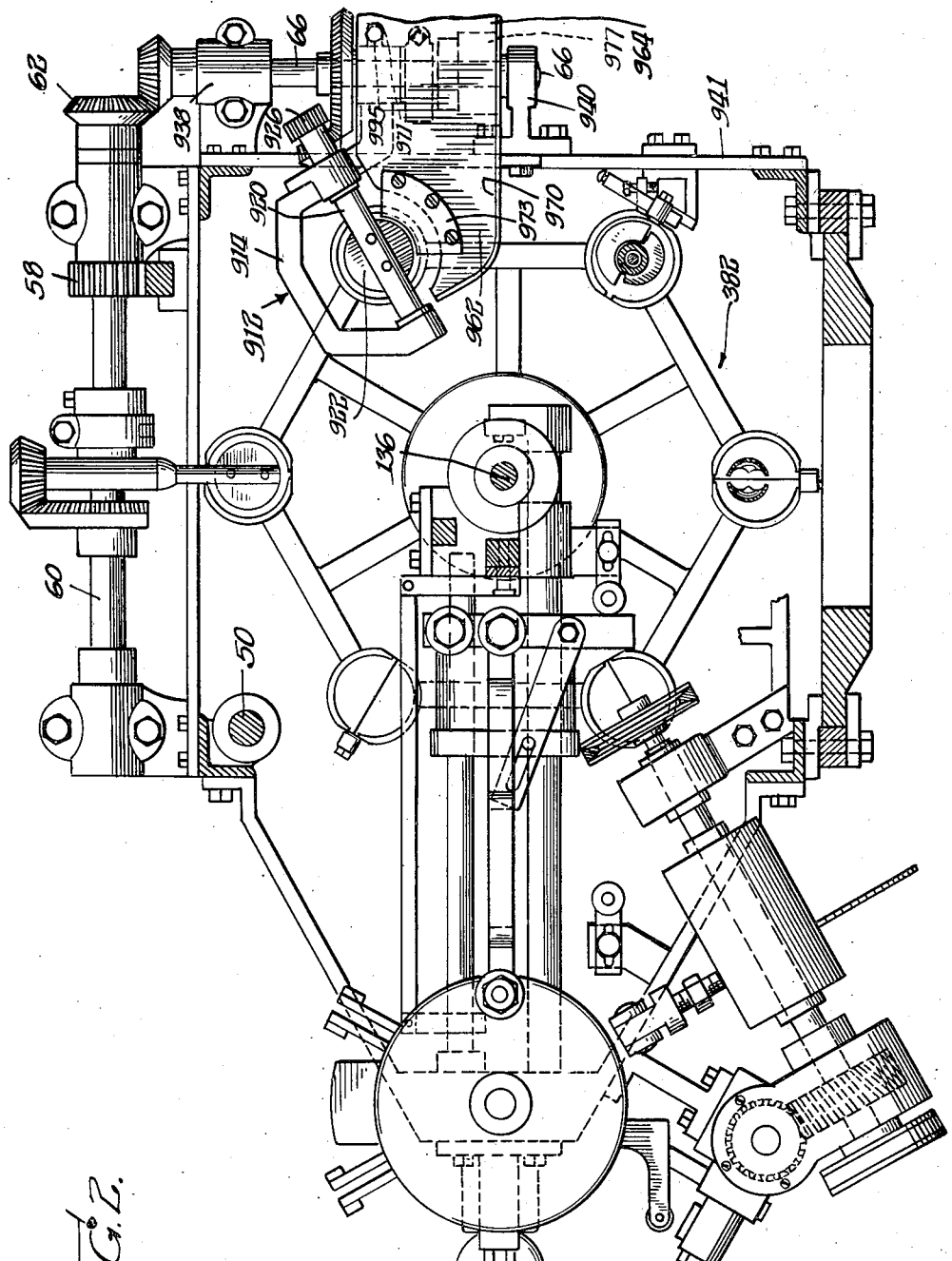
Figure 2 is a section taken on the line 2—2 of Figure 1.

Upon completion of the peeling operation, the peeling head moves up in synchronous relation with the lateral movement of the cup carrying the half fruit already peeled and pitted, with the half fruit overlying the loose peeling. With the intermittent counterclockwise movement of the cup-carrying turret 382, the cup carrying the pitted and peeled fruit, is next brought under the half fruit ejector 912, herein specifically disclosed as a rotatable or oscillatable paddle, as shown in Figures 2 and 8. As the half fruit cup comes directly below the ejector 912 (see Figure 8), the turret is momentarily halted in its intermittent movement, thereby allowing time for the fruit ejector to remove the half fruit from the fruit cup. To accomplish this ejection, a shiftable frame member 912 has on its outer end a bearing 916, and on its other end a flange 917 to support a bearing 918, which bearing, in combination with the bearing 916, supports opposite ends of a shaft 920. Attached to the underside of the shaft 920 is a flat circular disk or paddle 922, and which is positioned directly over the central portion of the half fruit cup. The shaft 920 is provided with a cut away portion on its underside to provide a surface, whereby the disk 922 may be attached by tapered head screws 924. On the outer end of the shaft 920 there is pinned a gear 926, which engages another gear 928 keyed on a sleeve 930 which is rotatably supported on a stud shaft 931, which has threaded engagement in a downwardly extending portion 932 of the main bearing 918. Also, keyed to this sleeve 930 is a bevel gear 934 engaging a larger bevel gear 936, which is, in turn, pinned to the hereinbefore mentioned shaft 66.

Attached to the stationary main upright vertical frame members 4 and 8 is a stationary cross frame member 941 (see Figure 2) and supporting bearings 938 and 940 supporting the shaft 66, which, in turn, supports the shiftable fruit ejecting frame 912. The bevel gear 64 hereinbefore described is also pinned to the shaft 66 at 942. In addition, the fruit ejecting or discharging frame 912 is provided with bearings 916 and 918, and also has an extension 944 which terminates in the bearing 946 on the shaft 66. This bearing portion 946 has formed on its lefthand end a sleeve portion 948, which is surrounded by a friction collar 950 pressed about the sleeve 948. Yieldably clamped about the friction collar 950 by a spring 953 are hinged friction band sections 951 and 952, which bands are tightened by the adjusting screw 954 which is threadedly connected to one section 952 of the hinged friction band at 955 and projects through the other portion of the friction band 951 as at 957. A hinge pin 959 connects the two friction band sections 951 and 952 together. Secured to the shaft 66 by a set screw 951 is the driving collar 963 which has a connecting lug 965 (see Figures 9 and 10) formed thereon and located between two spaced shoulders on the segment 952 of the friction band. This lug 965 thus drives the friction bands. In addition the shiftable bearing 946 carries at its rear an integrally formed lug 991 and this lug has a threaded opening to receive an adjusting screw 992, the head 995 of which directly underlies the rear part of the fruit receiving and discharging chute 964 hereinafter described, and which adjusting screw is for purposes hereinafter to be set forth.

Associated with the oscillatable fruit discharging frame 914 and its turnable fruit discharging paddle 922 is a fruit discharging chute 964 which in the present instance is shiftably mounted pivotally to move about the shaft 66. This chute at an inner portion thereof is formed arcuately and concentrically about the circular outline of the rim of the cup or about the circular outline of the paddle 922 but in spaced relation therefrom in the downward position of the fruit chute as hereinafter described, and this circular portion carries a flexible, preferably rubber or rubber substitute, segment 973 which is mounted on the chute by means of the screws 968 so that the flexible, overhanging, arcuate portion of this segment in the down position thereof is adapted flexibly to overlie or return to lie upon the adjacent rim of the cut face of the half fruit as shown in Figures 13 and 14. In addition, the chute is provided with an upstanding shield 970 which, as shown in Figure 1, is of sufficient height so that the half fruit when discharged thereagainst will be held upon the chute until the latter is oscillated or tipped rearwardly as hereinafter described. As shown clearly in Figures 8 and 12 the chute extends from a point where the resilient pad 973 overlies the rim of the cup, thence rearwardly to a position considerably overlying the shaft 66. As shown in Figures 12 and 15 that portion of the chute which overlies the shaft 66 is inclined with respect to the remainder of the chute. This is the preferred construction. The bottom of the chute carries integrally therewith a circular bearing 977 which embraces the bearing 940 surrounding the shaft 66. The relation is such that the bearing 977 of the chute is freely pivotal about the stationary sleeve bearing 940 whereby the chute may tilt toward and from the cup. In this manner a half peach is discharged by the paddle member 922 onto the chute, and then when the chute is tilted upwardly and rearwardly away from the cup, the half fruit will be discharged or projected from the chute outwardly of the machine away from the fruit cup. It will also be noted that the chute directly overlies and rests freely upon the extension 944 of the oscillatable paddle carrier 912 whereby when the paddle is oscillated upwardly as shown in dotted lines in Figure 9 or in Figure 15 the chute will be raised by the extension 944. However because of the free pivotal movement of the chute, the chute will fall of its own weight toward the cup.

Thus it will be seen that upon operation of the mechanism, when the turret has brought a cup into registration with the zone of action of the paddle 922 the intermittent movement of the turret holds the cup in this position and upon further actuation of the mechanism the paddle will then be brought downwardly from the dotted line position shown in Figure 9 to the full position shown in Figure 9. This is accomplished by the rotation of shaft 66 which causes the bevel gear 936 keyed to the shaft 66 to turn the bevel pinion 934 which in turn rotates the gears 928 and the shaft 920 clockwise through 180 degrees to oscillate the paddle through the cup, it being understood of course that the paddle assembly has been lowered at this time until the shoulder 975 on the shiftable bearing 946 has contacted the stop lug 962 on the stationary frame. Under reverse turning of the shaft 66 driving lug 963 and its extension 965 drives the friction clamp 951 and 952 and the friction set up by the friction clamps 950 and 951 gripping the bearing extension 948 turns the member 946 which causes the extension 944 to tip up as shown in dotted lines in Figure 9 until the lug 971 contacts the adjustable but stationary stop screw 958 on the bracket 967 which is formed on the stationary portion of the frame. Thereafter continued rotation of the shaft 920 will turn the ejector paddle 922 in position for lowering properly on the next section of half fruit.

Means is provided in association with the chute 970 for limiting the oscillatory movement of this chute with respect to and about its axis of turning 66. On the stationary frame member 940, see Figure 14, there is provided a projecting lug 991 which has a threaded aperture in which is located the adjusting pin or screw 992 the top of which directly underlies the inner portion of the chute 970, as shown in Figures 12 to 15 and Figure 8. This adjusting screw constitutes means for adjusting the position of the inner end or circular segment of the chute that lies adjacent the rim of the cup and its function is to adjust the downward position of this end of the chute so that the resilient, flexible, peel-retaining member 973 can never strike the hard rim of the cup in the down position of the chute because continued battering or impact of this flexible member against the rim of the cup will soon cause it to fray. However this adjusting screw gives sufficient adjustment so that this flexible member 973 may be positioned so as to overlie the rim of the half fruit at the cut face of the half fruit whether the half fruit be relatively thick, as shown in Figure 13, or whether it be relatively thin as shown in Figure 14. In either instance, as shown in Figures 12 and 14, the retaining member 973 must necessarily be out of contact with the upper rim of the cup.

When the half fruit is wiped out of the cup it is projected laterally into contact with the surface of the fruit ejector chute which may be inclined as shown in Figure 1. This chute raises with the frame 912 but drops independently of the frame 912. In the raised position of the chute and of the fruit discharging paddle 922 the turret may move to bring another cup into registration with the path of movement of the paddle 922 and conversely when the shaft 920 and its frame 912 are lowered the paddle 922 will be brought into registration with the open mouth of a fresh cup. During the lowering of the pad the chute 964 is free to drop of its own weight so as to position the rubber flap 973 into proper registration above the edge of the wall or rim of the mouth of the cup.

During the lifting of the paddle mechanism to the position shown in dotted lines in Figure 9, through the intermediary of the extension 944 the chute is likewise lifted by the underlying paddle mechanism to the full line position shown in Figure 15. Were it not for means hereinafter described the chute mechanism would be thrown back rather violently to the position shown in dotted lines in Figure 15, in which position it would be impacted violently rearwardly and after a succession of such movements it would soon be unfit for use. In addition it would make considerable noise and such extended movement as shown in dotted lines would delay the action of the chute to retained lowered position. Means is provided for preventing this undue movement of the chute 970. This means comprises the adjustable screw 995 which threads through an opening in the outer end of the shiftable or oscillatable arm 944 that carries the ejector 912 that carries the paddle 922. The upper end of this screw 995 is suitably adjusted so that in the raised or tilted position of the chute 970 the chute will contact the top of the screw 995 and be checked by same. It will be seen that the adjustment of this screw for effecting the undue movement of the chute in no way effects the adjustment of the screw 992.

Obviously the invention is not limited to the specific details of construction disclosed herein but is capable of other modifications and changes without departing from the spirit and scope of the appended claims.

The invention is hereby claimed as follows:

1. In a fruit treating machine, a holder to receive and hold a half fruit with its cut face exposed, a support shiftable upwardly and downwardly from the cup, a member carried by the support and shiftable therewith, means for shifting said support to register said member with the open mouth of the fruit holder and into adjacency with the cut face of the half fruit, means for turning said member when in such position of adjacency to discharge the half fruit from the fruit holder, a discharge chute, mounted to have a portion overlying said support whereby to be raised relatively to said holder by the elevation of said support from said fruit holder, said discharge chute being positioned to receive the half fruit when discharged from said holder by said first mentioned fruit discharge member, said discharge chute in said fruit receiving position being positioned adjacent the mouth of the fruit holder, said chute being lowered toward said fruit holder independently of the movement of said support back to its position adjacent said fruit holder.

2. In a fruit treating machine, the combination of fruit holding means adapted to support a half fruit with its cut face exposed, a support shiftable toward and from the fruit holder, a fruit contacting and discharging member shiftably mounted on said support for engagement with the cut face of the half fruit and operable on movement relatively to its support for discharging the half fruit from the fruit holder, a chute adapted in one position to be adjacent to and to overlie the mouth of the fruit holder and the cut face of the half fruit, means on said chute adapted to overlie the edge of the half fruit at the cut face thereof for holding the peel in the fruit holder during the discharge action of the half fruit from the fruit holder, said chute resting by gravity upon said shiftable support whereby said chute is shifted away from said fruit holder upon elevation of the support above the fruit holder, said chute returning to fruit receiving position by gravity.

3. In a fruit treating machine, the combination of fruit holding means adapted to support a half fruit with its cut face exposed, a support shiftable toward and from the fruit holder, a fruit contacting and discharging member shiftably mounted on said support for engagement with the cut face of the half fruit and operable on movement relatively to its support for discharging the half fruit from the fruit holder, a chute adapted in one position to overlie the mouth of the fruit holder and the cut face of the half fruit, means thereon adapted to overlie the edge of the half fruit at the cut face thereof for holding the peel in the fruit holder during the discharge action of the half fruit from the fruit holder, said chute resting by gravity upon said shiftable support whereby said chute is shifted away from said fruit holder upon movement of the support away from the fruit holder, said chute returning to fruit receiving position by gravity, and means for positioning said peel retaining means out of contact with the rim of the fruit holder when said chute is positioned adjacent the mouth of said fruit holder.

4. In a fruit treating machine, the combination of fruit holding means adapted to support a half fruit with its cut face exposed, a support shiftable toward and from the fruit holder, a fruit contracting and discharging member shiftably mounted on said support for engagement with the cut face of the half fruit and operable on movement relatively to its support for discharging the half fruit from the fruit holder, a chute adapted in one position to overlie the mouth of the fruit holder and the cut face of the half fruit, means thereon adapted to overlie the edge of the half fruit at the cut face thereof for holding the peel in the fruit holder during the discharge action of the half fruit from the fruit holder, said chute resting by gravity upon said shiftable support whereby said chute is shifted away from said fruit holder upon movement of the support away from the fruit holder, said chute returning to fruit receiving position by gravity, and means for controlling the extent of movement of the chute in a direction away from said fruit holder.

5. In a fruit treating machine, the combination of fruit holding means adapted to support a half fruit with its cut face exposed, a support shiftable toward and from the fruit holder, a fruit contacting and discharging member shiftably mounted on said support for engagement with the cut face of the half fruit and operable on movement relatively to its support for discharging the half fruit from the fruit holder, a chute adapted in one position to overlie the mouth of the fruit holder and the cut face of the half fruit, means thereon adapted to overlie the edge of the half fruit at the cut face thereof for holding the peel in the fruit holder during the discharge action of the half fruit from the fruit holder, said chute resting by gravity upon said shiftable support whereby said chute is shifted away from said fruit holder upon movement of the support away from the fruit holder, said chute returning to fruit receiving position by gravity, and means adjustably controlling the position of said chute adjacent the mouth of the fruit holder, and additional means for controlling the position of said chute in its extreme movement away from said fruit holder.

6. In a fruit treating machine, the combination of means forming a holder to hold a half fruit with its cut face exposed, a support shiftable to and from the fruit holder, a half fruit discharging mechanism shiftably mounted on said shiftable support and adapted to be brought into registration with the cut face of the half fruit and upon shifting movement relatively to its support for discharging the half fruit from the fruit holder, a pivotally mounted chute, means actuated by movement of the support away from said fruit holder to likewise raise said chute away from said fruit holder, said chute having means thereon adapted in one position to be positioned overlying the rim of the cut face of the half fruit when held in said fruit holder for retaining the peeling in the fruit holder upon discharge of the fruit from said fruit holder, said chute after being moved away from said fruit holder by said shiftable support being returnable to a position overlying said fruit holder by the action of gravity.

7. In a fruit treating machine, the combination of means forming a holder to hold a half fruit with its cut face exposed, a support shiftable to and from the fruit holder, a half fruit discharging mechanism shiftably mounted on said shiftable support and adapted to be brought into registration with the cut face of the half fruit and upon shifting movement relatively to its support for discharging the half fruit from the fruit holder, a pivotally mounted chute, means actuated by movement of the support away from said fruit holder to likewise raise said chute away from said fruit holder, said chute having means thereon adapted in one position to be positioned overlying the rim of the cut face of the half fruit when held in said fruit holder for retaining the peeling in the fruit holder upon discharge of the fruit from said fruit holder, said chute after being moved away from said fruit holder by said shiftable support being returnable to a position overlying said fruit holder by the action of gravity, and means for adjustably positioning said peel retaining means in overlying position with respect to the rim of the fruit holder but out of contact therefrom.

8. In a fruit treating machine, the combination of means forming a holder to hold a half fruit with its cut face exposed, a support shiftable to and from the fruit holder, a half fruit discharging mechanism shiftably mounted on said shiftable support and adapted to be brought into registration with the cut face of the half fruit and upon shifting movement relatively to its support for discharging the half fruit from the fruit holder, a pivotally mounted chute, means actuated by movement of the support away from said fruit holder to likewise raise said chute away from said fruit holder, said chute having means thereon adapted in one position to be positioned overlying the rim of the cut face of the half fruit when held in said fruit holder for retaining the peeling in the fruit holder upon discharge of the fruit from said fruit holder, said chute after being moved away from said fruit holder by said shiftable support being returnable to a position overlying said fruit holder by the action of gravity, and means for checking the extreme movement of said chute in a direction away from said fruit holder.

9. In a fruit treating machine, the combination of means forming a holder to hold a half fruit with its cut face exposed, a support shiftable to and from the fruit holder, a half fruit discharging mechanism shiftably mounted on said shiftable support and adapted to be brought into registration with the cut face of the half fruit and upon shifting movement relatively to its support for discharging the half fruit from the fruit holder, a pivotally mounted chute, means actuated by movement of the support away from said fruit holder, said chute having means thereon adapted in one position to be positioned overlying the rim of the cut face of the half fruit when held in said fruit holder for retaining the peeling in the fruit holder upon discharge of the fruit from said fruit holder, said chute after being moved away from said fruit holder by said shiftable support being returnable to a position overlying said fruit holder by the action of gravity, and means for adjustably positioning said peel retaining means in overlying position with respect to the rim of the fruit holder but out of contact therefrom, an adjusting stop carried by a stationary support and adapted to contact the underside of said chute for limiting the position of said chute with the peel retainer in spaced overlying relation from the rim of said fruit holder, and adjustable stop means carried by said support and adapted to contact said chute to limit the outward movement of said chute in a direction away from said fruit holder, with respect to said support.

10. In a fruit treating machine, the combination of means forming a holder to hold a half fruit with its cut face exposed, a support shiftable to and from the fruit holder, a half fruit discharging mechanism shiftably mounted on said shiftable support and adapted to be brought into registration with the cut face of the half fruit and upon shifting movement relatively to its support for discharging the half fruit from the fruit holder, a pivotally mounted chute, means actuated by movement of the support away from said fruit holder to likewise raise said chute away from said fruit holder, said chute having means thereon adapted in one position to be positioned overlying the rim of the cut face of the half fruit when held in said fruit holder for retaining the peeling in the fruit holder upon discharge of the fruit from said fruit holder, said chute after being moved away from said fruit holder by said shiftable support being returnable to a position overlying said fruit holder by the action of gravity, and means for checking the extreme movement of said chute in a direction away from said fruit holder, an adjusting stop carried by a stationary support and adapted to contact the underside of said chute for limiting the position of said chute with the peel retainer in spaced overlying relation from the rim of said fruit holder, and adjustable stop means carried by said support and adapted to contact said chute to limit the outward movement of said chute in a direction away from said fruit holder, with respect to said support.

11. In a fruit treating machine, the combination of means forming a fruit holder adapted to hold a half fruit with its cut face exposed, a shaft disposed adjacent said fruit holder in one position of said fruit holder, a support oscillatably mounted on said shaft, a second shaft carried by said support, a fruit discharging member carried by said second shaft and adapted to be positioned by said oscillatable support whereby said discharging member is disposed in overlying relation to the cut face of the half fruit when held in said fruit holder, means for operating said first mentioned shaft for shifting said fruit discharging means to discharge the fruit from the holder, a chute pivotally mounted on said first mentioned shaft and adapted to overlie said oscillatable support whereby upon oscillatable movement in one direction said support is adapted to move said chute away from said fruit holder, said chute having means mounted thereon adapted to be positioned to overlie an edge of the cut face of the half fruit when said chute is positioned adjacent said fruit holder, whereby to retain the peeling in the holder during the discharge of the half fruit therefrom, a stationary support, a stop adjustably mounted thereon and adapted to engage that portion of the chute on one side of the first mentioned shaft for maintaining the peel retaining means out of contact with the mouth of the fruit holder, and an adjustable stop mounted on said first mentioned adjustable stop and movable therewith and adjustable relatively thereto and adapted to engage said chute to limit the movement of said chute by said oscillatable support in a direction away from said fruit holder, said chute being returnable by gravity independently of the return of said oscillatable support, to a position adjacent the mouth of the fruit holder.

12. In a fruit treating machine, the combination of a holder adapted to hold a half fruit with its cut face exposed, fruit discharging means adapted to register with the cut face of the half fruit and to shift through the fruit holder to discharge the half fruit therefrom, a chute, means for shiftably mounting said chute so that in one position said chute is positioned adjacent the mouth of the cup to receive the half fruit when discharged from said first mentioned fruit discharging means, said chute being contacted by said shiftable support whereby to shift the chute away from said fruit holding means to discharge the half fruit from said chute, said chute being returnable to position independently of the movement of said shiftable support, and means for controlling the extreme shiftable positions of said chute.

13. In a fruit treating machine, the combination of a holder adapted to hold a half fruit with its cut face exposed, fruit discharging means adapted to register with the cut face of the half fruit and to shift through the fruit holder to discharge the half fruit therefrom, a chute, means for shiftably mounting said chute so that in one position said chute is positioned adjacent the mouth of the cup to receive the half fruit when discharged from said first mentioned fruit discharging means, said chute being contacted by said shiftable support whereby to shift the chute away from said fruit holding means to discharge the half fruit from said chute, said chute being returnable to position independently of the movement of said shiftable support, and adjustable means for determining the extreme positions of movement of said chute.

14. In combination with a rotatable turret, a series of fruit receptacles thereon each adapted to hold a half fruit with its cut face exposed, a fruit discharging member mounted adjacent the turret and shiftable about an axis radially disposed with respect to the turret, said fruit discharging member in one position being adapted to overlie the cut face of the half fruit and adapted to sweep through the fruit receiver to discharge the half fruit therefrom in a direction at right angles to said radial axis, and a chute shiftable relatively to said turret and disposed laterally of said axis for receiving the discharged half fruit, said first mentioned fruit discharging means being pivotally mounted to pivotally swing away from said fruit receiver to discharge the half fruit onto said chute, and means actuated by the upward movement of said first mentioned fruit discharging means for tipping said chute so as to discharge the half fruit thereon clear of the turret, said chute being returnable to a position adjacent the fruit receiver by the action of gravity.

15. In combination with a rotatable turret, a series of fruit receptacles thereon each adapted to hold a half fruit with its cut face exposed a fruit discharging member mounted adjacent the turret and shiftable about an axis radially disposed with respect to the turret, said fruit discharging member in one position being adapted to overlie the cut face of the half fruit and adapted to sweep through the fruit receiver to discharge the half fruit therefrom in a direction at right angles to said radial axis, and a chute shiftable relatively to said turret and disposed laterally of said axis for receiving the discharged half fruit, said first mentioned fruit discharging means being pivotally mounted to pivotally swing away from said fruit receiver to discharge the half fruit onto said chute, and means actuated by the upward movement of said first mentioned fruit discharging means for tipping said chute so as to discharge the half fruit thereon clear of the turret, said chute being returnable to a position adjacent the fruit receiver by the action of gravity, and adjustable means to limit the extreme positions of said chute relative to the open mouth of the fruit receiver and relatively to said shiftable support carrying said first mentioned discharge member.

16. In a fruit treating machine, the combination of a fruit cup adapted to receive a half fruit and an underlying peeling of a half fruit with the cut face of the fruit uppermost, a reversely rotatable shaft, a frame mounted on said shaft, said frame providing spaced bearings, a second shaft rotatably mounted in the bearings of said frame, a discharging member mounted on said shaft for registration with said cup in one position of the frame, gear means carried by said first mentioned shaft and intermeshing gear means carried by said second mentioned shaft, said frame having an extension providing spaced abutments, spaced stop means adapted to be contacted by said abutments, and a friction slip driving connection between said shaft and said extension frame operative upon reverse rotations of said first mentioned shaft to shift said frame to place said fruit discharging member in registration with the mouth of the cup and thereafter to rotate said fruit discharging member with relation to the cup to contact the cut face of the fruit, invert the fruit, and discharge the same from the cup, and a chute oscillatably mounted for free rotation with respect to said first mentioned shaft for receiving said discharged fruit, said chute being raisable by said extension to discharge the fruit therefrom.

17. In a fruit treating machine, the combination of a fruit cup adapted to receive a half fruit and an underlying peeling of a half fruit with the cut face of the fruit uppermost, a reversely rotatable shaft, a frame mounted on said shaft, said frame providing spaced bearings, a second shaft rotatably mounted in the bearings of said frame, a discharging member mounted on said shaft for registration with said cup in one position of the frame, gear means carried by said first mentioned shaft, said frame having an extension providing spaced abutments, spaced stop means adapted to be contacted by said abutments, a friction slip driving connection between said shaft and said extension frame operative upon reverse rotations of said first mentioned shaft to shift said frame to place said discharging member in registration with the mouth of the cup to contact the cut face of the fruit, invert the half fruit, and discharge the same from the cup, means positioned adjacent the peeling in the cup for retaining the peeling therein during the ejection of the half fruit therefrom, and means contacted by said fruit discharging member while the latter is being elevated, for raising said peeling retaining means from a position adjacent the mouth of the cup to a position spaced from and above the mouth of the cup.

18. In a device of the class described, in combination with a support, bearings on the support, a shaft oscillatably mounted on said bearings, means for oscillating said shaft, a gear fixed on said shaft, a frame rotatably mounted on said shaft, a driving collar oscillatably mounted on said shaft, a second shaft carried by said frame, a fruit discharge member carried by said second shaft, a turret, spaced cups carried by said turret, means for shifting said turret to position the cup in registration with said fruit ejecting member, means for driving the second shaft from the gear on said first shaft, a friction clutch driven from said driving collar and frictionally gripping an extension of said frame whereby frictionally to oscillate said frame with said first mentioned shaft, a collar freely rotatable on the bearing of said first mentioned shaft, a chute carried by said collar, said chute underlying said extension frame to be lifted thereby on oscillation of said frame and to permit said chute to drop by its own weight upon the return of said frame to a horizontal position.

19. In a device of the class described, in combination with a support, a reversely rotatable shaft mounted thereon, a gear on and driven by said shaft, a frame mounted on said shaft and turnable relatively thereto, said frame having an extension providing bearings for an adjusting screw on said extension, a second shaft rotatably mounted in said bearings, gearing interconnecting the second shaft with the gear on said first shaft, fruit ejecting mechanism mounted on said second shaft for turning movement therewith, a driving collar rigidly mounted on and turnable with said first mentioned shaft, said collar having a lateral projection, a collar rotatably mounted on one of said bearings, a chute carried by said collar, said chute overlying said frame extension, a flexible member carried by said chute and adapted to overlie the inner edge of the mouth of the cup, said discharge member and its shaft adapted diametrically to overlie the cup with the discharge member registering with the mouth of the cup, and a friction clutch interconnecting the driving collar and the frame extension whereby to raise the frame extension from the cup and likewise to raise the chute therewith.

20. In a fruit treating machine, the combination of a fruit holder to receive and hold a half fruit with the peeling severed therefrom and loosely underlying the half fruit, fruit discharging means having a portion configured overlyingly to contact the cut face of the half fruit, means to move the discharging means to discharge the half fruit from the holder, means positioned adjacent the peeling in the cup for retaining the peeling therein during the discharge of the half fruit from the cup, mechanism for actuating said discharge means positively to contact and raise said peel retaining means to a position remote from the position of the peel retaining means when retaining the peeling in the cup, said peel retaining means being free from positive connection with said actuating mechanism and returnable by gravity to its peel retaining position adjacent the mouth of the cup, and means for adjustably controlling the raised position of the peel retaining means when raised from its peel retaining position.

21. In a fruit treating machine, the combination of a fruit holder to receive and hold a half fruit with the peeling severed therefrom and loosely underlying the half fruit, fruit discharging means having a portion configured overlyingly to contact the cut face of the half fruit, means to move the discharging means to discharge the half fruit from the holder, means positioned adjacent the peeling in the cup for retaining the peeling therein during the discharge of the half fruit from the cup, mechanism for actuating said discharge means positively to contact and raise said peel retaining means to a position remote from the position of the peel retaining means when retaining the peeling in the cup, said peel retaining means being free from positive connection with said actuating mechanism and returnable by gravity to its peel retaining position adjacent the mouth of the cup, and means for adjustably controlling the raised and lowered positions of the peel retaining means.

22. In a fruit treating mechanism, the combination of a holder to receive a half fruit with the peeling severed therefrom and loosely underlying the same, half fruit discharging means having a portion configured overlyingly to contact the cut face of the half fruit, means to raise the discharging means to discharge the half fruit from the holder, a receiver adapted to be positioned laterally of the fruit holder and constructed and arranged to receive the half fruit therein when discharged from the holder by the discharging means, and mechanism for actuating said discharging means to raise said receiver to fruit discharging position relatively remote from said fruit receiving position of said receiver, said receiver having a lost motion connection with relation to said actuating mechanism whereby it is returnable to fruit receiving position independently of the return of said fruit discharging means to fruit contacting position.

RAYMOND L. EWALD.
HENRY A. SKOG.

REFERENCES CITED

The following references are of record in the file of this patent:

UNITED STATES PATENTS

| Number | Name | Date |
|---|---|---|
| 2,242,241 | Ewald | May 20, 1941 |
| 2,242,242 | Ewald | May 20, 1941 |

Certificate of Correction

July 19, 1949

Patent No. 2,476,239

RAYMOND L. EWALD ET AL.

It is hereby certified that errors appear in the above numbered patent requiring correction as follows:

In the drawings, Sheet 5, Figure 8 should appear as shown below instead of as in the patent—

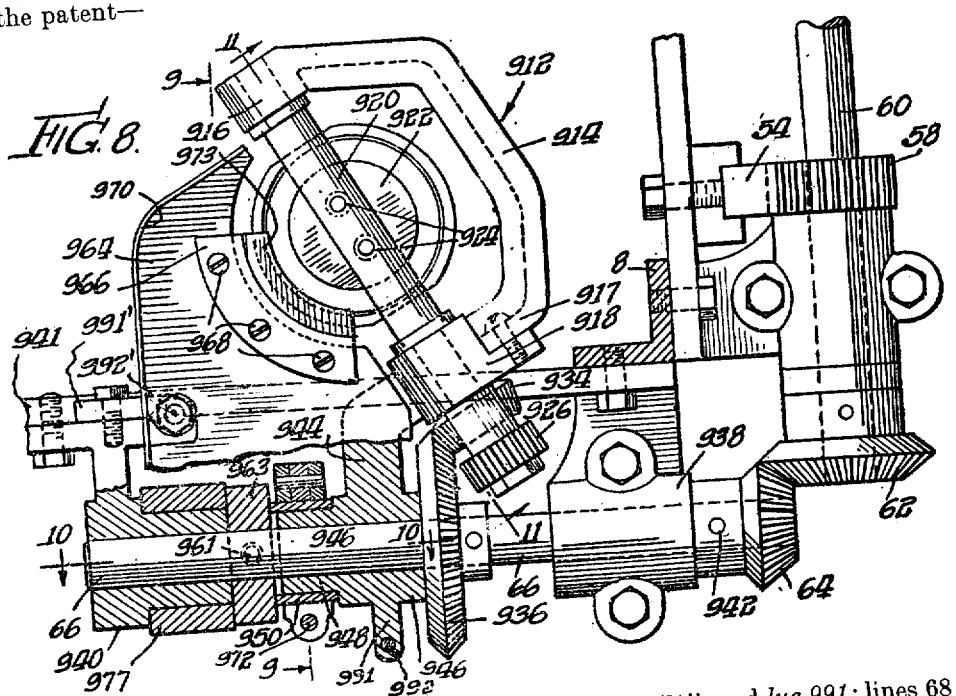

in the printed specification, column 8, line 57, for "lug 971" read *lug 991*; lines 68 and 69, for "lug 991" read *lug 991'*; line 70, for "screw 992" read *screw 992'*; column 10, line 65, for the word "contracting" read *contacting*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*